(12) United States Patent
Piper et al.

(10) Patent No.: US 8,266,232 B2
(45) Date of Patent: Sep. 11, 2012

(54) HARDWARE PROCESSING OF COMMANDS WITHIN VIRTUAL CLIENT COMPUTING ENVIRONMENT

(75) Inventors: Scott A. Piper, Bothell, WA (US); Vikas Ahluwalia, Kirkland, WA (US); Kam-Lun Ng, Bellevue, WA (US); Paul R. Shaw, Edmonds, WA (US); Vinod Menon, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 11/250,866

(22) Filed: Oct. 15, 2005

(65) Prior Publication Data
US 2007/0088792 A1    Apr. 19, 2007

(51) Int. Cl.
*G06F 15/16* (2006.01)
*G06F 9/00* (2006.01)
(52) U.S. Cl. ......... 709/207; 709/200; 709/228; 712/227
(58) Field of Classification Search .................. 709/200, 709/207, 328; 710/33, 52, 53, 57; 711/110, 711/119; 712/227; 345/501, 503, 505, 506, 345/522, 530, 531, 536, 541, 553, 554, 556, 345/559; 365/221; 375/240.28; 382/154
See application file for complete search history.

(56) References Cited

U.S. PATENT DOCUMENTS

| | | | | |
|---|---|---|---|---|
| 5,754,839 | A * | 5/1998 | Pardo et al. | 712/227 |
| 5,818,469 | A | 10/1998 | Lawless et al. | |
| 5,838,334 | A * | 11/1998 | Dye | 345/503 |
| 5,881,269 | A * | 3/1999 | Dobbelstein | 703/21 |
| 6,038,619 | A * | 3/2000 | Berning et al. | 710/33 |
| 6,049,390 | A * | 4/2000 | Notredame et al. | 358/1.15 |
| 6,088,044 | A | 7/2000 | Kwok et al. | |
| 6,091,422 | A * | 7/2000 | Ouaknine et al. | 345/419 |
| 6,112,267 | A * | 8/2000 | McCormack et al. | 710/52 |
| 6,118,452 | A * | 9/2000 | Gannett | 345/418 |

(Continued)

FOREIGN PATENT DOCUMENTS

JP         2002132489 A    5/2002

(Continued)

OTHER PUBLICATIONS

Lawless et al., "Rendering OpenGL in a Processor Subsystem," IBM Technical Disclosure Bulletin, Mar. 1996, pp. 137-140.

(Continued)

*Primary Examiner* — Haresh N Patel
*Assistant Examiner* — Peter Shaw
(74) *Attorney, Agent, or Firm* — Thomas Tyson

(57) ABSTRACT

Commands are processed by hardware within a virtual client computing environment, such as graphics-related commands processed by graphics hardware. A server computing device includes graphics hardware, a virtual client computing environment, and a server computing environment. The graphics hardware processes graphics-related commands into responses. The virtual client computing environment includes an encoding application that issues the commands. The server computing environment includes a decoding application. The encoding application includes a first thread that receives the commands and places them onto a first queue. The encoding application includes a second thread that receives the responses from a second queue and communicates the responses to a remote display device. The decoding application includes a third thread that receives the commands from the first queue, communicates the commands to the graphics hardware, receives the responses from the graphics hardware, and places the responses onto the second queue.

16 Claims, 7 Drawing Sheets

U.S. PATENT DOCUMENTS

| | | | |
|---|---|---|---|
| 6,332,161 B1 * | 12/2001 | Sasson | 709/227 |
| 6,470,403 B1 * | 10/2002 | Houg | 710/57 |
| 6,553,426 B2 * | 4/2003 | Holzle et al. | 719/310 |
| 6,651,082 B1 * | 11/2003 | Kawase et al. | 718/105 |
| 6,674,805 B1 * | 1/2004 | Kovacevic et al. | 375/240.28 |
| 6,728,959 B1 * | 4/2004 | Merkey | 718/102 |
| 6,753,878 B1 | 6/2004 | Heirich et al. | |
| 6,853,380 B2 | 2/2005 | Alcorn | |
| 6,986,061 B1 * | 1/2006 | Kunzinger | 713/153 |
| 7,064,766 B2 * | 6/2006 | Beda et al. | 345/557 |
| 7,196,710 B1 * | 3/2007 | Fouladi et al. | 345/553 |
| 7,230,917 B1 * | 6/2007 | Fedorkow et al. | 370/229 |
| 7,308,448 B1 * | 12/2007 | Martin et al. | 707/8 |
| 2002/0106184 A1 * | 8/2002 | Belley et al. | 386/46 |
| 2003/0120747 A1 * | 6/2003 | Kim | 709/217 |
| 2004/0041814 A1 * | 3/2004 | Wyatt et al. | 345/556 |
| 2004/0130552 A1 * | 7/2004 | Duluk et al. | 345/506 |
| 2004/0181579 A1 * | 9/2004 | Huck et al. | 709/205 |
| 2004/0189669 A1 * | 9/2004 | David et al. | 345/619 |
| 2004/0260921 A1 * | 12/2004 | Treadwell | 713/150 |
| 2005/0149908 A1 * | 7/2005 | Klianev | 717/109 |
| 2006/0146057 A1 * | 7/2006 | Blythe | 345/506 |
| 2006/0146058 A1 * | 7/2006 | Zhang et al. | 345/531 |
| 2006/0150071 A1 * | 7/2006 | Chen | 715/500.1 |
| 2007/0073693 A1 * | 3/2007 | Harris et al. | 707/8 |
| 2007/0120865 A1 * | 5/2007 | Ng | 345/582 |

FOREIGN PATENT DOCUMENTS

| | | |
|---|---|---|
| JP | 2005506595 A | 3/2005 |
| TW | 541507 B | 7/2003 |

OTHER PUBLICATIONS

Snell et al., "White Paper: IBM Deep Computing Visualization," Jan. 2005.

Mills, "IBM Deep Computing Visualization (DCV) Overview," copyright 2005.

S. Stegmaier et. al., "A generic solution for hardware-accelerated remote visualization," Joint Eurographics—IEEE TCVG Symp. on Visualization, year 2002.

European Patent Office office action in corresponding EPO patent application, application 06 807 187.7, dated Jun. 14, 2010.

PCT international search report and written opinion in corresponding PCT patent application, application PCT/EP2006/067319, dated Feb. 26, 2007.

VirtualGL 1.0 User's Guide, cited in PCT search report, Oct. 14, 2005, downloads.sourceforge.net, ref XP-002411847.

VirtualGL Project, excerpt from source, cited in PCT search report, Oct. 14, 2005, downloads.sourceforget.net, ref XP-002411848.

S. Stegmaier et al., "Widening the remote visualization bottleneck," Image & Signal Processing & Analysis, Sep. 18, 2003.

S. Stegmaier et al., "A generic solution for hardare-accelerated remote visualization," IEEE TCVG Symp. on Visualization, year 2002.

R. Berardini, "IBR-based compression for remote visualization," Procs. of 1st Int'l Symp. on 3D Data Proc'g Visualization and Transmission, year 2002.

Office action response filed in corresponding EPO patent application in European Patent Office, application 0607187.7, dated Oct. 15, 2010.

VirtualGL releases on SourceForge.net, sourceforge.net/projects/virtualgl/files/VirtualGL, corresponds to XP002411849 of PCT search report, dated Dec. 15, 2006.

Virtual GL 1.0 User's Guide, dated Oct. 14, 2005, first cited in Japanese Patent Office (JPO) in counterpart JP patent application on Aug. 23, 2011.

G. Humphreys et al., "WireGL" technical article, Proceeds of the 28th Annual Conference on Computer Graphics and Interactive Techniques, dated year Aug. 2001, first cited in Japanese Patent Office (JPO) in counterpart JP patent application on Aug. 23, 2011.

European Office Action in counterpart European patent application 06 807 187.7-2221, dated Mar. 6, 2012.

Response to European Office Action in counterpart European patent application 06 807 187.7-2221, filed Mar. 22, 2012.

* cited by examiner

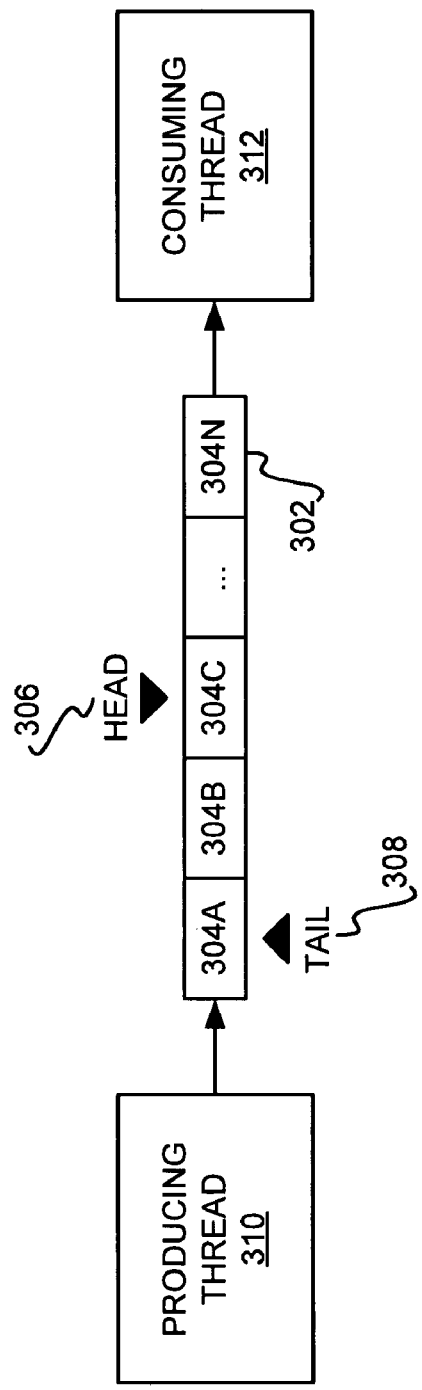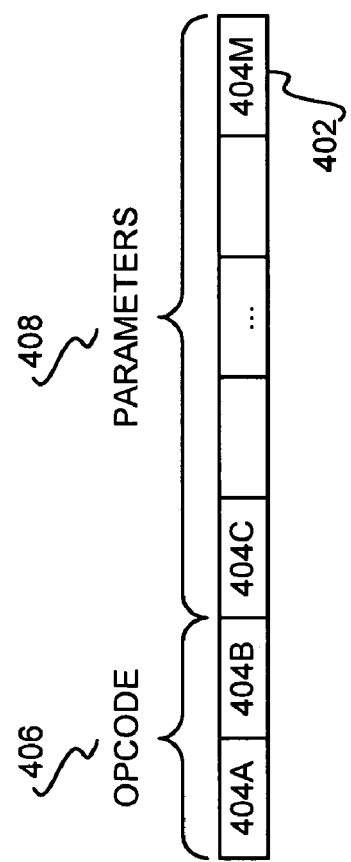

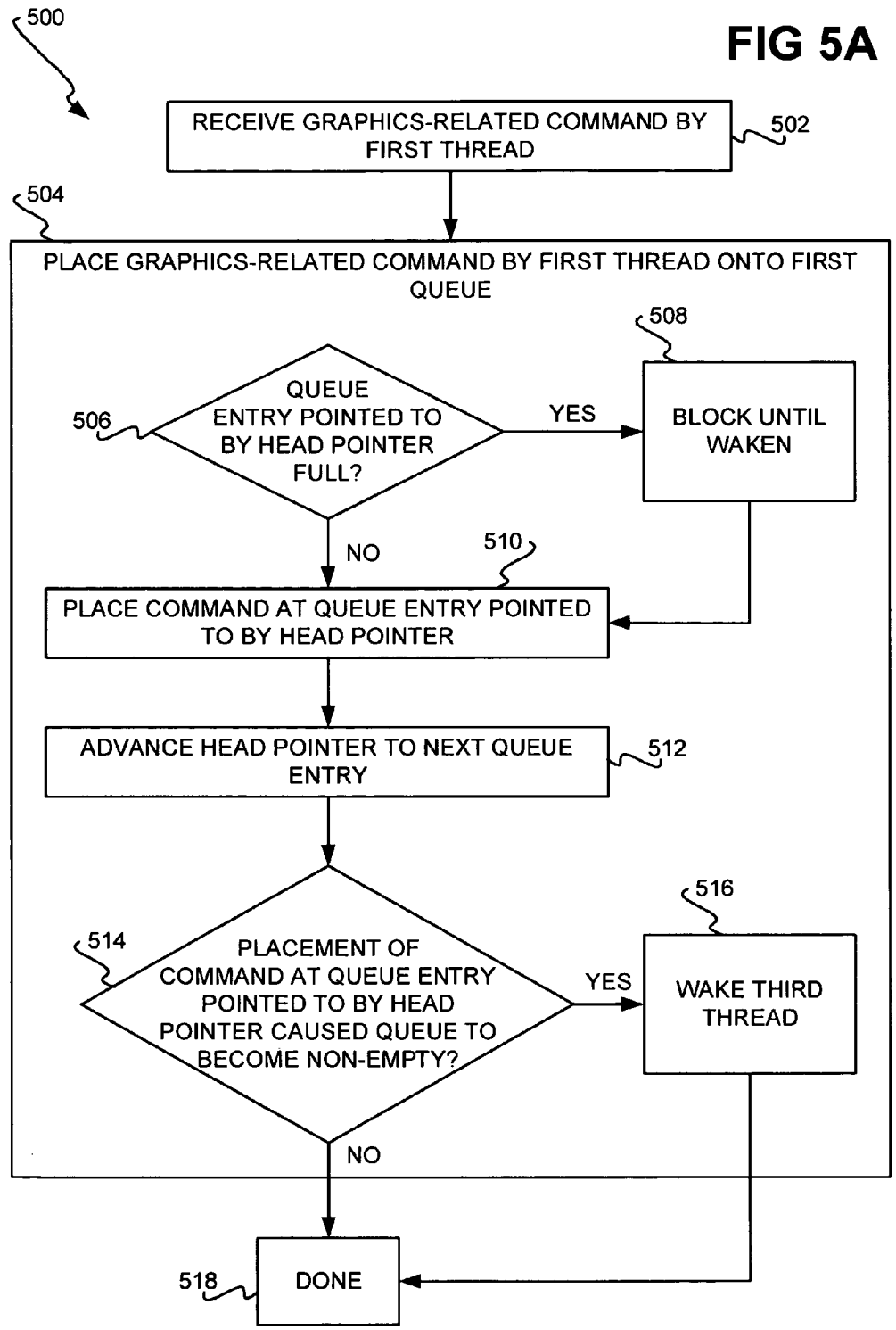

HARDWARE PROCESSING OF COMMANDS WITHIN VIRTUAL CLIENT COMPUTING ENVIRONMENT

FIELD OF THE INVENTION

The present invention relates generally to virtual client computing environments, such as Microsoft Windows® Terminal Services environments, and more particularly to the hardware processing of commands within such environments, such as the processing of graphics-related commands by graphics hardware within such environments.

BACKGROUND OF THE INVENTION

Organizations typically have tens, hundreds, or thousands of computer users. Historically, each computer user has had his or her own client computing device. The client computing devices of all the computer users are usually connected to one another via a network, which eases administration of the devices to great extent. However, some maintenance is still typically needed on the client computing devices themselves, which means that administrators and other information technology (IT) personnel periodically have to visit each client computing device, which is time-consuming and costly. Furthermore, providing a separate computing device to each computer user is itself a costly endeavor.

Therefore, more recently, many organizations have migrated their computing resources to a terminal services-type environment, which is also referred to herein as a virtual client computing environment. In these types of environments, a central server computing device hosts a large number of computer users, with each user assigned to a separate session running within the operating system on the server computing device. Each computer user still has a client computing device, but such client computing devices act primarily as dumb terminals. Users provide input at the client computing devices, and the client computing devices provide output to the users, but otherwise all application program processing is performed at the server computing device. Examples of such virtual client computing environments include the Microsoft Windows® Terminal Services environment, and virtual client computing environments available from Citrix Systems of Fort Lauderdale, Fla.

Virtual client computing environments are advantageous for at least two reasons. First, the client computing devices of the computing users, because they only perform input/output functionality, do not have to be very sophisticated. As a result, the cost-per-user is decreased substantially. Instead of having the latest, and expensive, processor and other hardware components, for instance, a client computing device can have a cheaper, and slower, processor, as well as other cheaper hardware components. Overall performance is not degraded, because primary application program processing is performed at the server computing device, not at the client computing device.

Second, maintenance on such multiple-user systems is substantially performed at the server computing device itself, and not at the client computing devices. For instance, upgrading memory, processing power, hard disk drive storage, and so on, is provided by increasing these resources at the server computing device, not at the client computing devices. As a result, maintenance costs incurred by IT personnel are reduced, because the IT personnel do not have to visit each client computing device to perform many regular maintenance tasks.

One downside to employing a virtual client computing environment is in the area of graphics processing. Sophisticated graphics processing is typically performed at least in part by dedicated graphics hardware, and not solely in software. Graphics-related commands are standardized in accordance with standards such as OpenGL. An application program running on a computing device provides such graphics-related commands to the operating system running on the computing device. The operating system in turn conveys these commands to the graphics hardware of the computing device, which processes them for rendering on the display device of the computing device, or for reporting back to the application program. Having dedicated graphics hardware process the graphics-related commands provides for graphics processing that is usually many orders of magnitude faster than if such graphics-related commands were processed in software—that is, by a processor of the computing device, like any other software, and not aided by specialized hardware.

Virtual client computing environments are not well situated to take advantage of dedicated graphics hardware to process graphics-related commands, however. If the graphics hardware is located at the client computing device itself, it cannot be employed by the client application programs running within a virtual client computing environment on a server computing device. This is because the client application programs run within the confines of the operating system provided on the server computing device, and thus do not have access to the graphics hardware on the client computing devices themselves for processing graphics-related commands. Furthermore, even if such access were possible, adding expensive graphics hardware to client computing devices defeats the purpose of having virtual client computing environments in the first place, which is to save costs by having the client computing devices acting primarily as dumb terminals.

In addition, if the graphics hardware is located at the server computing device, it typically cannot be employed by client application programs running within virtual client computing environments on the server computing device. For example, in a Microsoft Windows® environment, the graphics hardware may be accessed directly only by server application programs running on the server computing device, and not by client application programs running within virtual client computing environments on the server computing device.

A solution to this problem in Linux® environments is found in the Deep Computing Visualization (DCV) product available from International Business Machines, Inc., of Armonk, N.Y. DCV generally allows the graphics hardware of a server computing device to be leveraged by client application programs running within virtual client computing environments on the server computing device, even where the output of such programs is displayed at the client computing devices, and not at the server computing device. DCV utilizes various inter-process communication (IPC) mechanisms so that client application programs can pass graphics-related commands to the graphics hardware of the server computing device, the responses to which are then passed back to the programs themselves or displayed at the client computing devices.

However, it has been found that DCV provides for less than optimal performance in graphics-related command processing in Microsoft Windows® environments. Insofar as the point of accessing the graphics hardware of the server computing device for the benefit of the client computing devices is to enhance graphics performance, the less than optimal performance of DCV means that it is not an adequate solution to this problem. Therefore, there is a need for allowing client application programs running within virtual client computing environments on Microsoft Windows®-based server computing devices to leverage the graphics hardware of such server computing devices for the benefit of client computing devices. Such leveraging should provide performance approaching that as if the graphics hardware were installed on the client computing devices themselves and accessible by the client application programs. For these and other reasons, therefore; there is a need for the present invention.

SUMMARY OF THE INVENTION

The present invention relates to the hardware processing of commands within a virtual client computing environment, such as the processing of graphics-related commands by graphics hardware. A server computing device of an embodiment of the invention includes graphics hardware, first and second queues, a virtual client computing environment, and a server computing environment. The graphics hardware is for processing graphics-related commands into graphics-related command responses.

The virtual client computing environment is for interacting with a remote client computing device communicatively coupled to the server computing device. The virtual client computing environment includes an encoding application that issues the graphics-related commands. The encoding application includes a first thread to receive the graphics-related commands and to place the graphics-related commands onto the first queue. The encoding application also includes a second thread to receive the graphics-related command responses from the second queue and to communicate the graphics-related command responses to a display device of the remote client computing device.

The server computing environment is for managing the virtual client computing environment, and includes a decoding application. The decoding application includes a third thread to receive the graphics-related commands from the first queue, to communicate the graphics-related commands to the graphics hardware for processing, to receive the graphics-related command responses from the graphics hardware, and to place the graphics-related command responses onto the second queue.

A server computing device of another embodiment of the invention includes hardware, a virtual client computing environment, and a server computing environment. The hardware is for processing specific commands into responses more quickly than is capable of being accomplished in software alone. The virtual client computing environment is for interacting with a remote client computing device communicatively coupled to the server computing device and for issuing the specific commands and includes a first thread and a second thread. The server computing environment is for managing the virtual client computing environment and includes a third thread.

The first thread is to receive the specific commands issued within the virtual client computing environment and to place them onto a first queue. The second thread is to receive the responses from a second queue and to communicate them to corresponding hardware of the remote client computing device. The third thread is to receive the specific commands from the first queue, to communicate them to the hardware for processing, to receive the responses from the hardware, and to place them onto the second queue.

A method of an embodiment of the invention receives a graphics-related command by a first thread of a virtual client computing environment of a server computing device, as issued by an encoding application running within the virtual client computing environment of the server computing device. The virtual client computing environment is for interacting within a remote client computing device communicatively coupled to the server computing device. The server computing environment is for managing the virtual client computing environment.

The first thread places the graphics-related command onto a first queue. A third thread of the server computing environment receives the graphics-related command from the first queue. The third thread communicates the graphics-related command to graphics hardware of the server computing device for processing into a graphics-related command response. The third thread receives the graphics-related command response from the graphics hardware, and places it onto a second queue. A second thread of the virtual client computing environment receives the graphics-related command response from the second queue, and communicates it to a display device of the remote client computing device.

An article of manufacture of an embodiment of the invention includes a computer-readable medium, and first, second, and third means in the medium. The medium may be a recordable data storage medium, a modulated carrier signal, or another type of computer-readable medium. The first means is for receiving commands issued within a virtual client computing environment and for placing the commands onto a first queue. The second means is for receiving responses from a second queue and for communicating them to corresponding hardware of a remote client computing device associated with the virtual client computing environment. The third means is for receiving the commands from the first queue, for communicating them to hardware for processing into the responses, for receiving the responses from the hardware, and for placing them onto the second queue.

Embodiments of the invention provide for advantages over the prior art. Like the Deep Computing Visualization (DCV) prior art described above, embodiments of the invention leverage graphics hardware at the server computing device for use by client application programs running on the server computing device for displaying information on the display devices of the remote client computing devices. However, the architecture inherent to embodiments of the invention provides for significant performance gains over the DCV and other prior art. The specific utilization of threads and queues as described above, for instance, provides embodiments of the invention with significant performance enhancement over the DCV and other prior art.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of a queue that can be employed within the computer architecture of FIG. 2, according to an embodiment of the invention.

FIG. 4 is a diagram of a queue entry that can be employed within the queue of FIG. 3, according to an embodiment of the invention.

FIGS. 5A, 5B, 5C, and 5D are flowcharts of methods for achieving high-performance graphics-related command processing within a virtual client computing environment, according to varying embodiments of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
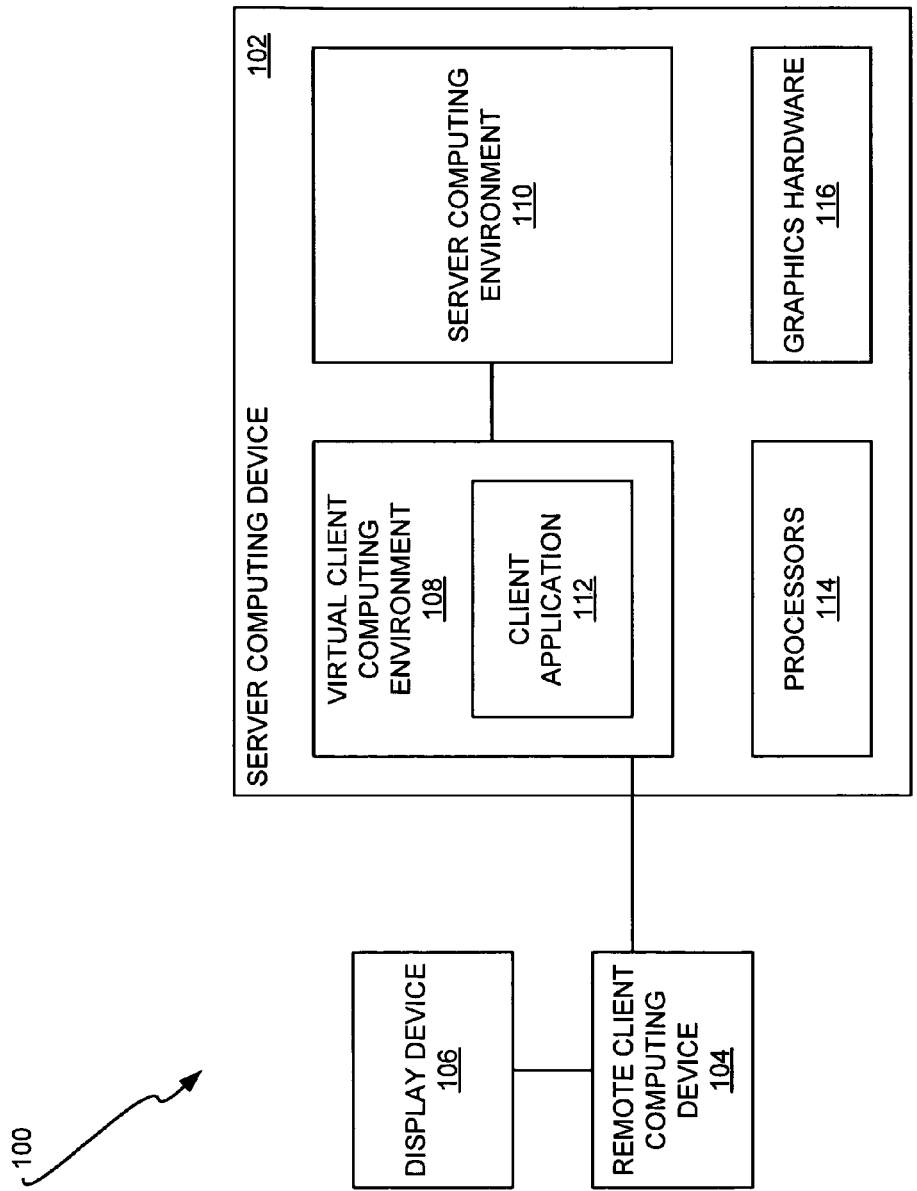
FIG. 1 is a diagram of a computer architecture for implementing a virtual client computing environment, according to an embodiment of the invention.

FIG. 1 shows a computer architecture 100 for achieving a virtual client computing environment, according to an embodiment of the invention. The virtual client computing environment may be a Microsoft Windows® Terminal Services environment, a virtual client computing environment as provided by Citrix Systems of Fort Lauderdale, Fla., or another type of terminal services or virtual client computing environment. The computer architecture 100 includes a server computing device 102 and a remote client computing device 104.

The server computing device 102 includes a virtual client computing environment 108 and a server computing environment 110, which are primarily software applications, as well as processors 114, graphics hardware 116, and other types of hardware commonly found in a server computing device, but which are not depicted in FIG. 1 for illustrative convenience. The virtual client computing environment 108 corresponds to the remote client computing device 104. All or substantially all input and output with the user of the remote client computing device 104 is performed at the remote client computing device 104. However, all or substantially all processing of such input to provide such output is accomplished within the virtual client computing environment 108. The virtual client computing environment 108 thus is said to interact with the remote client computing device 104, which is communicatively coupled to the server computing device 102 via a network or other mechanism. Whereas only one virtual client computing environment and only one remote client computing device 104 are depicted in FIG. 1, in actuality there will typically be more than one such computing environment and more than one such client computing device.

The virtual client computing environment 108 runs as a session within an operating system. Client application programs, such as the client application 112, thus run within the computing environment 108 for the computer user of the remote client computing device 104. The virtual client computing environment 108 may run in its own partition of the server computing device 102 in one embodiment. The server computing environment 110 is the managing environment for all the virtual client computing environments, and therefore manages the virtual client computing environment 108. For instance, the server computing environment 110 may be responsible for managing the execution and administration of the virtual client computing environments, such as the client application programs running therein, as well as may be responsible for the instantiation and deletion of such virtual client computing environments. The server computing environment 110 may run within its own partition of the server computing device 102 in one embodiment.

Therefore, the user interacts with the remote client computing device 104 as if the client application 112 were running on an operating system installed on the remote client computing device 104. However, in actuality the operating system is installed on the server computing device 102. Input from the user is conveyed from the remote client computing device 104 to the virtual client computing environment 108 for processing by the client application 112, and other applications within the environment 108, using the hardware resources of the server computing device 102, such as the processors 114 and the graphics hardware 116. Output to the user is then conveyed from the client application 112, or other applications within the environment 108, to the remote client computing device 104, where it may be displayed, for example, on the display device 106 of the remote client computing device 104.

The remote client computing device 104 thus acts as a dumb terminal. The client computing device 104 receives input from and displays output to the user, but the input and output themselves are processed at the server computing device 102, within the virtual client computing environment 108. Therefore, where upgrading of processing power is needed, for example, just the hardware of the server computing device 102 needs to be upgraded, and not the hardware of the remote client computing device 104. Other advantages usually attributable to terminal services and other types of virtual client computing environments are also realized by the computer architecture 100 of FIG. 1. The virtual client computing environment 108 is thus a virtual environment in that it is not located at the remote client computing device 104 of the computer user itself, but rather is located at the server computing device 102, which is not typically physically accessible by the computer user.

Figure 2:
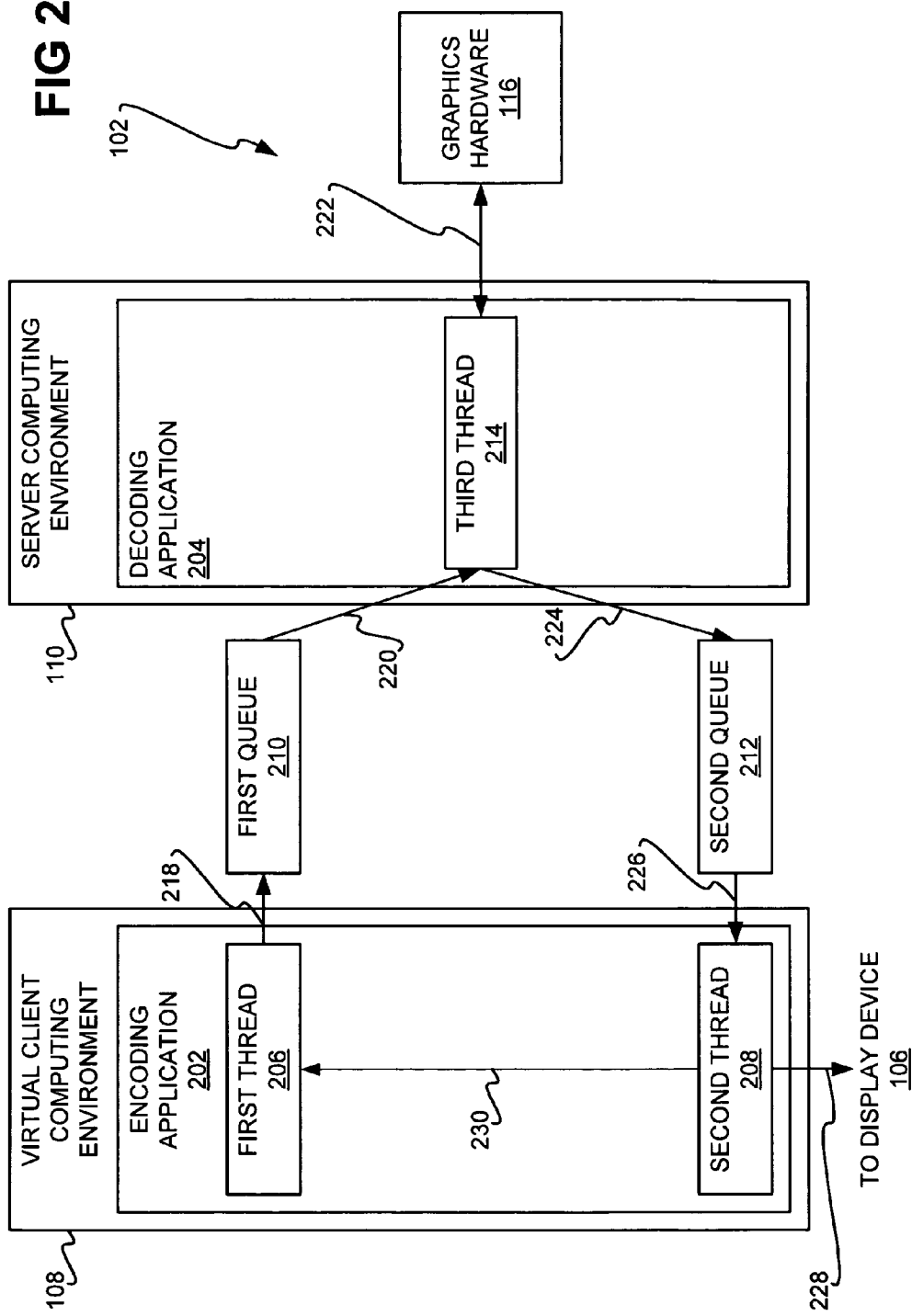
FIG. 2 is a diagram of an architecture of a server computing device for achieving high-performance graphics-related command processing within a virtual client computing environment, according to an embodiment of the invention.

FIG. 2 shows the architecture of the server computing device 102 in more detail, for achieving high-performance graphics processing by the client application programs running within the virtual client computing environments, according to an embodiment of the invention. The virtual client computing environment 108 includes an encoding application 202, which is software. The server computing environment 110 includes a decoding application 204, which is also software. The server computing device 102 also includes a first queue 210 and a second queue 212 shared between the virtual client computing environment 108 and the server computing environment 110. The queues 210 and 212 may be created by conventional Microsoft Windows® application programming interfaces (API's), in one embodiment of the invention. The encoding application 202 includes a first thread 206 and a second thread 208, whereas the decoding application 204 includes a third thread 214. A thread is part of a larger process or program. Thus, the threads 206 and 208 are part of the encoding application 202, whereas the thread 214 is part of the decoding application 204. The applications 202 and 204 share the queues 210 and 212.

The architecture of FIG. 2 operates as follows. The thread 206 receives a graphics-related command from within the encoding application 202. The graphics-related command may be a command that is more quickly processed into a graphics-related command response by the graphics hardware 116, as compared to substantially or completely within software, such as executed by the processors 114. That is, the graphics-related command is processed by the graphics hardware to provide the greatest performance benefits. The graphics-related command may be an OpenGL graphics-related command, or another type of graphics-related command.

The first thread 206 of the encoding application 202 places the graphics-related command onto the first queue 210, as indicated by the arrow 218. If placing the graphics-related command onto the first queue 210 causes the queue 210 to become non-empty—that is, if the queue 210 was empty before the thread 206 placed the graphics-related command onto the queue 210—then the first thread 206 also wakes the third thread 214 of the decoding application 204. The thread 214 then receives, or consumes, the graphics-related command from the first queue 210, as indicated by the arrow 220.

The thread 214 communicates the graphics-related command to the graphics hardware 116, as indicated by the arrow 222, and the graphics hardware 116 processes the command into a graphics-related command response. The graphics hardware 116 processes the graphics-related command into a graphics-related command response more quickly than normal software processing of the command into the response, such as by the processors 114, can typically be accomplished. The thread 214 receives the graphics-related command response from the graphics hardware 116, as is also indicated by the arrow 222.

The third thread 214 of the decoding application 204 places the graphics-related command response onto the second queue 212, as indicated by the arrow 224. If placing the graphics-related command response onto the second queue 212 causes the queue 212 to become non-empty—that is, if the queue 212 was empty before the thread 214 placed the graphics-related command response onto the queue 212—then the third thread 214 also wakes the second thread 208 of the encoding application 202. The thread 208 then receives, or consumes, the graphics-related command response from the second queue 212, as indicated by the arrow 226. The thread 208 communicates the graphics-related command response to the display device 106 of the remote client computing device 104, as indicated by the arrow 228. For instance, if the response is a bitmap to be displayed on the display device 106, then the thread 208 communicates the response to the display device 106.

In this way, the embodiment of the invention depicted in FIG. 2 provides for enhanced graphics-related command processing by the graphics hardware 116 for ultimate display by the display device 106 of the remote client computing device 104, even though the display device 106 is not directly connected to the graphics hardware 116. As compared to the Deep Computing Visualization (DCV) prior art that has been described, the embodiment of FIG. 2 employs three threads 206, 208, and 214, as well as two queues 210 and 212, as has been described. The utilization of these three threads 206, 208, and 214, and these two queues 210 and 212, provides the embodiment of FIG. 2 with performance advantages over the DCV prior art, as well as over other prior art.

Several special situations and particular and more general aspects are now described in relation to the operation of the architecture of the server computing device 102 of FIG. 2. First, the first queue 210 may be completely full, such that the first thread 206 is unable to place more graphics-related commands onto the first queue 210. In such instance, the first thread 206 blocks, or waits until the first queue 210 is no longer completely full, so that it can again place more graphics-related commands onto the first queue 210. The first queue 210 becomes non-full as the third thread 214 receives, or consumes, graphics-related commands from the first queue 210. When the third thread 214 receives or consumes a command from the queue 210 that causes the queue 210 to transition from full to non-full, in one embodiment it wakes the first thread 206 to indicate to the first thread 206 that it can again place commands onto the first queue 210. Waking threads as accomplished in one embodiment of the invention can be accomplished by sending a conventional inter-thread Microsoft Windows® event.

Second, and similarly, the second queue 212 may be completely full, such that the third thread 214 is unable to place more graphics-related command responses onto the second queue 212. In such instance, the third thread 214 blocks, or waits until the second queue 212 is no longer completely full, so that it can again place more graphics-related command response onto the second queue 212. The second queue 212 becomes non-full as the second thread 208 receives, or consumes, graphics-related command responses from the second queue 212. When the second thread 208 receives or consumes a response from the queue 212 that causes the queue 212 to transition from full to non-full, in one embodiment it wakes the third thread 214 to indicate to the third thread 214 that it can again place responses onto the second queue 212.

Third, it is noted that no provision is made in the embodiment of FIG. 2 to associate the graphics-related command responses provided in the second queue 212 with the graphics-related commands provided in the first queue 210. This is because graphics-related commands, such as OpenGL graphics-related commands in particular, may be divided into two categories: asynchronous commands and synchronous commands. The former are commands for which the encoding application 202 generating the graphics-related commands requires no response. Such commands may include those that return void, which are the majority of OpenGL graphics-related commands in particular, as well as the special case of the OpenGL SwapBuffers command, which returns the contents of the graphics hardware frame buffer associated with the encoding application 202. This frame buffer is sent to the display device 106, but the encoding application 202 need not be notified that this has happened. Thus, the second thread 208 consumes the response to a SwapBuffers command from the second queue 212 asynchronously.

Therefore, because the majority of graphics-related commands are usually asynchronous commands, there is no need to associate the graphics-related command responses provided in the second queue 212 with the graphics-related commands provided in the first queue 210. The graphics-related command responses can be processed independently of the graphics-related commands, and the latter does not have to be synchronized with the former. In other words, the first thread 206 and the second thread 208 of the encoding application 202 operate at least substantially independently for the majority of graphics-related commands. As the first thread 206 receives graphics-related commands, it places them onto the first queue 210, and as the second thread 208 receives graphics-related command responses from the second queue 212, it conveys them to the display device 106. The former activity is thus disassociated with the latter activity.

However, some graphics-related commands are indeed synchronous. Synchronous commands are those for which the encoding application 202 that generated the commands requires return values. Synchronous graphics-related commands occur relatively infrequently. Therefore, the following mechanism is employed when such commands are encountered. When the first thread 206 places a synchronous graphics-related command on the first queue 210, it blocks and waits for the response to this command to arrive on the second queue 212. When the second thread 208 receives, or consumes, a synchronous command response from the second queue 212, it signals or otherwise notifies the first thread 206, as indicated by the arrow 230, such as by using a Microsoft Windows® messaging event, as can be appreciated by those of ordinary skill within the art. The first thread 206 correspondingly wakes, reads the result from the second queue 212 (as may be provided by the second thread 208), and returns it to within the encoding application 202. This process or mechanism is referred to as a rendezvous between the threads 206 and 208.

Fourth, it is noted that the second thread 208 is needed in addition to the first thread 206 of the encoding application 202, as follows. Even though the thread 206 blocks until the results of a synchronous command are available, it does not also process the responses provided in the second queue 212, and rather the thread 208 processes the responses provided in the queue 212, because asynchronous commands, such as the SwapBuffers command, also can return responses. The thread 206 returns processor control to the encoding application 202 immediately after queuing an asynchronous command within the queue 210, and there is no guarantee that the encoding application 202 will cause processor control to again execute the thread 206 to process the response to an asynchronous command. As a result, the second thread 208 is provided so that responses that are generated by asynchronous commands can be processed in a timely manner.

Fifth, in general, it is noted that for each encoding application within each virtual client computing environment, there is a pair of threads 206 and 208 in one embodiment of the invention. The encoding application 202 is an encoder in that it produces graphics-related commands, such as OpenGL graphics-related commands. The decoding application 204 is a decoder in that it renders these commands to produce responses, such as bitmaps or graphics rendering states.

Because the majority of OpenGL graphics-related commands in particular are asynchronous, the encoding application need not wait for completion of a command to continue its processing once it has produced that command. The encoding application 202 can simply queue the command within the first queue 210 for later processing by the decoding application 204. Similarly, as has been described, the decoding application 204 can process the graphics-related commands into graphics-related command responses asynchronously, queuing the responses within the second queue 212 for later processing by the encoding application 202.

FIG. 3 shows a representative queue 302 that can be employed as the queue 210 or the queue 212, according to an embodiment of the invention. The queue 302 is described in relation to a producing thread 310 and a consuming thread 312. Where the queue 302 is employed as the queue 210, the first thread 206 is the producing thread 310 and the third thread 214 is the consuming thread 312. Where the queue 302 is employed as the queue 212, the third thread 214 is the producing thread 310 and the second thread 208 is the consuming thread 312.

The queue 302 has a number of queue entries 304A, 304B, 304C, . . . , 304N, collectively referred to as the queue entries 304. Each of the queue entries 304 is capable of storing a graphics-related command, where the queue 302 implements the queue 210, or a graphics-related command response, where the queue 302 implements the queue 212. There are two pointers associated with the queue 302: a head pointer 306 and a tail pointer 308. The head pointer 306 typically points to the next queue entry that is empty, in which a command or a command response can be placed, whereas the tail pointer 308 typically points to the queue entry containing the next command or command response that is to be consumed.

However, the tail pointer 308 will point to an empty queue entry where the queue 302 is completely empty. In such instance, the tail pointer 308 points to the same empty queue entry as the head pointer 306 does, so that it is known that the queue is completely empty when the tail pointer 308 points to an empty queue entry and the head pointer 306 and the tail pointer 308 both point to the same empty queue entry. Thus, when first starting, the queue 302 is empty, and the head pointer 306 and the tail pointer 308 both point to the first queue entry 304A. Furthermore, it is noted that the head pointer 306 will point to an occupied queue entry where the queue 302 is completely full. In such instance, the head pointer 306 points to the same occupied queue entry as the tail pointer 308 does, so that it is known that the queue is completely full when the head pointer 306 points to an occupied queue entry and the head pointer 306 and the tail pointer 308 both point to the same occupied queue entry.

When the producing thread 310 is to place a command or a response in a queue entry, it places the command or response into the queue entry pointed to by the head pointer 306, and advances the head pointer 306 one queue entry to the right in one embodiment of the invention (or to the left in another embodiment). Where the head pointer 306 already points to the last queue entry 304N, then the head pointer 306 rolls over to point to the first queue entry 304A. It is noted that the producing thread 310 only places a command or response into the queue entry pointed to by the head pointer 306 if that queue entry is empty.

However, the producing thread 310 always advances the head pointer 306 to the next queue entry to the right (or to the left in another embodiment) after placing a command or a response in the queue 302, even if that next queue entry is full. This is because commands and responses are placed and consumed in a first-in first-out (FIFO) manner. Advancing the head pointer 306 to the next queue entry to the right (or to the left in another embodiment), even if this entry is full, is accomplished because this next queue entry if full or occupied will be the next queue entry consumed by the consuming thread 312, such that this queue entry is the entry that will become empty next. That is, this next queue entry is guaranteed to be pointed to by the tail pointer 308 in such an instance.

When the consuming thread 312 is to receive or consume a command or a response in a queue entry, it receives or consumes the command or response pointed to by the tail pointer 308, and advances the tail pointer 308 one queue entry to the right in one embodiment of the invention (or to the left in another embodiment). Where the tail pointer 308 already points to the last queue entry 304N, then the tail pointer 308 rolls over to point to the first queue entry 304A. It is noted that the consuming thread 312 only receives or consumes a command or response from the queue entry pointed to by the tail pointer 308 if that queue entry is occupied.

However, the consuming thread 312 always advance the tail pointer 308 to the next queue entry to the right (or to the left in another embodiment) after receiving or consuming a command or a response from the queue 302, even if the next queue entry is empty. As before, this is because commands and responses are placed and consumed in a FIFO manner. Advancing the tail pointer 308 to the next queue entry to the right (or to the left in another embodiment), even if this entry is empty, is accomplished because this next queue entry if empty will be the next queue entry into which another command or response is placed by the producing thread 310, such that the queue entry becomes occupied or full. That is, this next queue entry is guaranteed to be pointed to by the head pointer 306 in such an instance.

In another embodiment of the invention, the queue 302 is considered to be empty when the head and tail pointers 306 and 308 point to the same queue entry, and the queue 302 is considered to be full when incrementing the head pointer 306 would make it equal to or greater than the tail pointer 308. Thus, a thread would not increment the head pointer 306 in this embodiment of the invention if doing so would make it equal to the tail pointer 308. Either the embodiment described in the preceding paragraphs may be employed, the embodiment described in this paragraph may be employed, or another embodiment of the invention may be employed in relation to implementing the invention.

It is noted that advancement of the head pointer 306 and the tail pointer 308 for the queue 302 are desirably synchronized, which can be accomplished by using the Microsoft Window® API InterlockedCompareExchangePointer( ), as can be appreciated by those of ordinary skill within the art. The producing thread 310 is not allowed to add an entry to a full queue, and the consuming thread 312 is not allowed to consume an entry from an empty queue. For this reason, synchronization of the advancement, or movement, of the pointers 306 and 308 is desirable.

FIG. 4 shows a representative queue entry 402 that can be employed as any of the queue entries 304 of the queue 302, according to an embodiment of the invention. The queue entry 402 is made up of a number of bytes 404A, 404B, 404C, . . . , 404M, collectively referred to as the bytes 404. In one embodiment, the first two bytes 404A and 404B are used to signify an opcode 406 of a graphics-related command or a graphics-related command response. For instance, OpenGL commands and responses are identified by opcodes that are assigned unsigned short integers of two bytes in length. The remaining bytes 404C through 404M are employed to represent the parameters 408 of graphics-related commands and command responses, which vary in number and format depending on the command or response in question. For example, the OpenGL command glVertex3fv employs three parameters, each of type GLfloat.

In one embodiment, the queue entry 402 has a fixed size regardless of the type of graphics-related command or command response that it holds, such that not all the bytes 404 may be used by the queue entry 402 for a given command or response. Stated another way, some graphics-related commands and command responses may be longer than other commands and command responses. Therefore, the queue entry 402 in this embodiment is sized to hold the largest graphics-related command or command response, so that it is guaranteed that the queue entry 402 can hold any graphics-related command or command response as needed.

FIGS. 5A, 5B, 5C, and 5D show methods 500, 520, 540, and 560, respectively, for achieving high-performance graphics-related command processing within a virtual client computing environment, according to varying embodiments of the invention. The methods 500, 520, 540, and 560 together form a single method for achieving such high-performance graphics-related command processing. However, the methods 500, 520, 540, and 560 can be substantially performed concurrently with one another, and relatively independently of one another. Whether the methods 500, 520, 540, and 560 are performed depends on to great extent whether there are commands to be placed in the first queue 210, whether there are commands in the first queue 210 to be consumed, whether there are responses to be placed in the second queue 212, and whether there are responses in the second queue 212 to be consumed, respectively.

Referring first to FIG. 5A, the method 500 is performed when a graphics-related command is received by the first thread 206 (502), as may be issued within the virtual client computing environment 108, such as by the encoding application 202 running therein. The first thread 206 attempts to place the graphics-related command onto the first queue 210 (504). If the queue entry pointed to by the head pointer for the first queue 210 is full (506), then the first thread 206 blocks until it is waken by the third thread 214 (508). At some point, this queue entry is or becomes empty, such that the first thread 206 places the command at the queue entry pointed to by the head pointer (510). The first thread 206 then advances the head pointer to the next queue entry within the first queue 210 (512).

If placement of the command at the queue entry pointed to by the head pointer in part 510 caused the queue 210 to become non-empty (514) (i.e., the queue 210 was previously empty and now is not empty), then the first thread 206 also may wake the third thread 214 (516) for the third thread 214 to consume this command. The method 500 is then finished (518), but is repeated each time a graphics-related command is received by the first thread 206 for placement onto the first queue 210. That is, the method 500 is repeated each time the first thread 206 is entered by the encoding application to issue a graphics-related command.

Figure 5B:
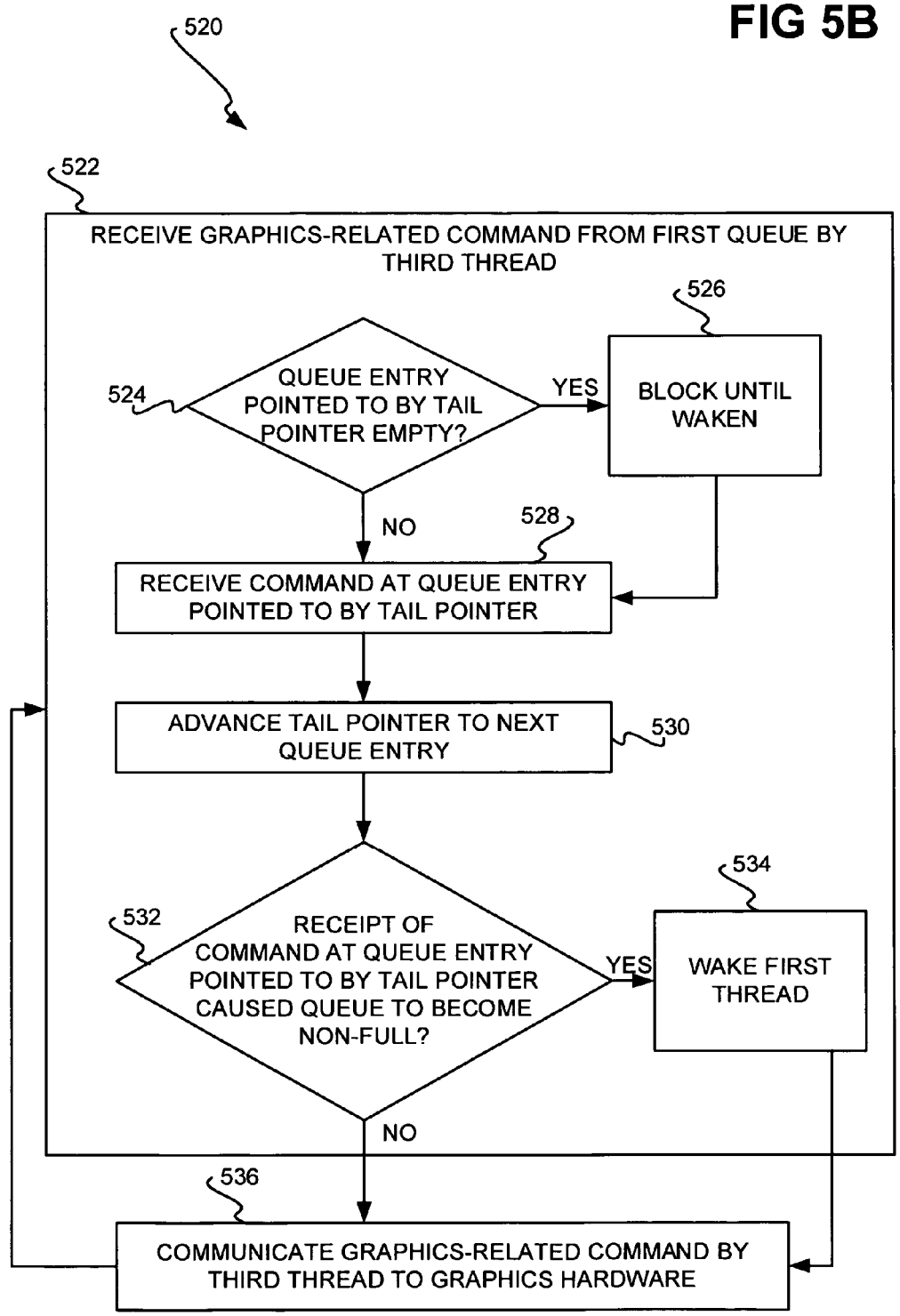

Referring next to FIG. 5B, the method 520 is performed when a graphics-related command is to be received from the first queue 210 by the third thread 214. The method 520 is described as starting in relation to being performed when the third thread 214 attempts to receive a graphics-related command from the first queue 210 (522). Thus, if the queue entry pointed to by the tail pointer for the queue 210 is empty (524), then the third thread 214 blocks until it is waken by the first thread 206 (526), to indicate that there is a command on the first queue 210 now that is to be consumed. In actuality, then, the method 520 starts at part 526, since initially it is not waken until there is a command on the first queue 210. However, the method 520 is depicted in FIG. 5B as starting by attempting to receive a graphics-related command from the queue 210 in part 522 for illustrative consistency and correspondence with the method 500 of FIG. 5A.

Therefore, ultimately the third thread 214 receives a command at the queue entry pointed to by the tail pointer (528). Receipt of the command consumes the command from the queue entry, such that this queue entry then becomes empty. The third thread 214 advances the tail pointer to the next queue entry within the first queue 210 (530). Furthermore, if receipt of the command at the queue entry pointed to by the tail pointer caused the queue 210 to become non-full (532) (i.e., it was previously full and now is no longer full), then the third thread 214 wakes the first thread 206 (534), which may have been blocking in part 508 of the method 500 of FIG. 5A. The third thread 214 ultimately communicates the graphics-related command to the graphics hardware 116 for processing (536). The third thread 214 then repeats the method 520 beginning at 522. That is, the third thread 214 may at some point receive all the commands within the queue 210, such that it blocks at part 526.

Figure 5C:
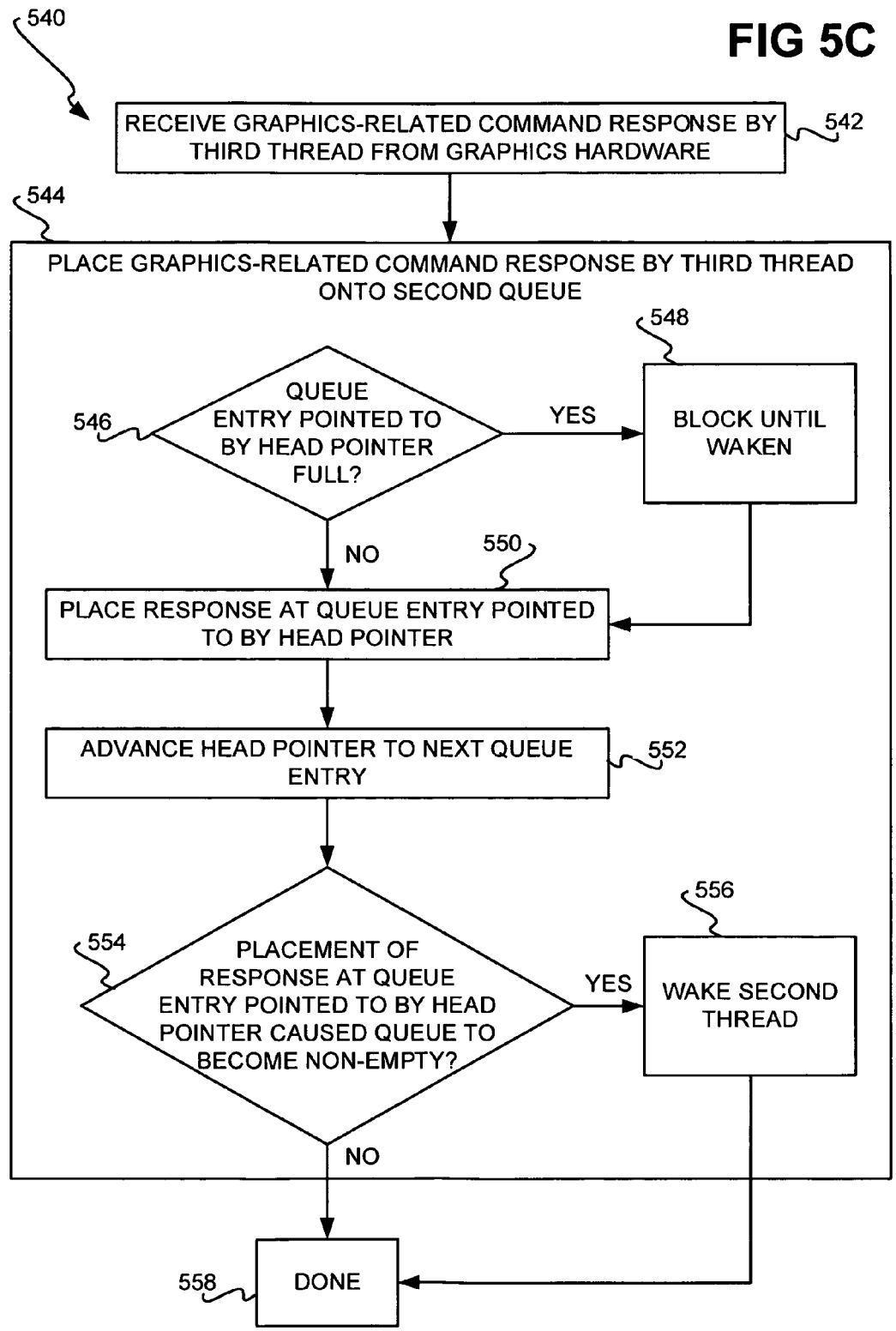

Referring next to FIG. 5C, the method 540 is performed when a graphics-related command response is received by the third thread 214 from the graphics hardware 116 (542). The method 540 is performed by the third thread 214 concurrently with the method 520 of FIG. 5B. Thus, that the third thread 214 blocks in part 526 of the method 520 means that it blocks in relation to the method 520, and not in relation to the method 540 of FIG. 5C. Similarly, that the third thread 214 blocks in part 548 of the method 540 means that it blocks in relation to the method 540, and not in relation to the method 520 of FIG. 5B.

The third thread 214 attempts to place the graphics-related command response onto the second queue 212 (544). If the queue entry pointed to by the head pointer for the second queue 212 is full (546), then the third thread 214 blocks until it is waken by the second thread 208 (548). At some point, this queue entry is or becomes empty, such that the third thread 214 places the response at the queue entry pointed to by the head pointer (550). The third thread 214 then advances the head pointer to the next queue entry within the second queue 212 (552).

If placement of the response at the queue entry pointed to by the head pointer in part 550 caused the queue 212 to become non-empty (554) (i.e., the queue 212 was previously empty and now is no longer empty), then the third thread 214 also may wake the second thread 208 (556) for the second thread 208 to consume this response. The method 540 is then finished (558), but is repeated each time a graphics-related command response is received by the third thread 214 for placement onto the second queue 212. That is, the method 540 is repeated each time the third thread 214 receives a response from the graphics hardware 116.

Figure 5D:
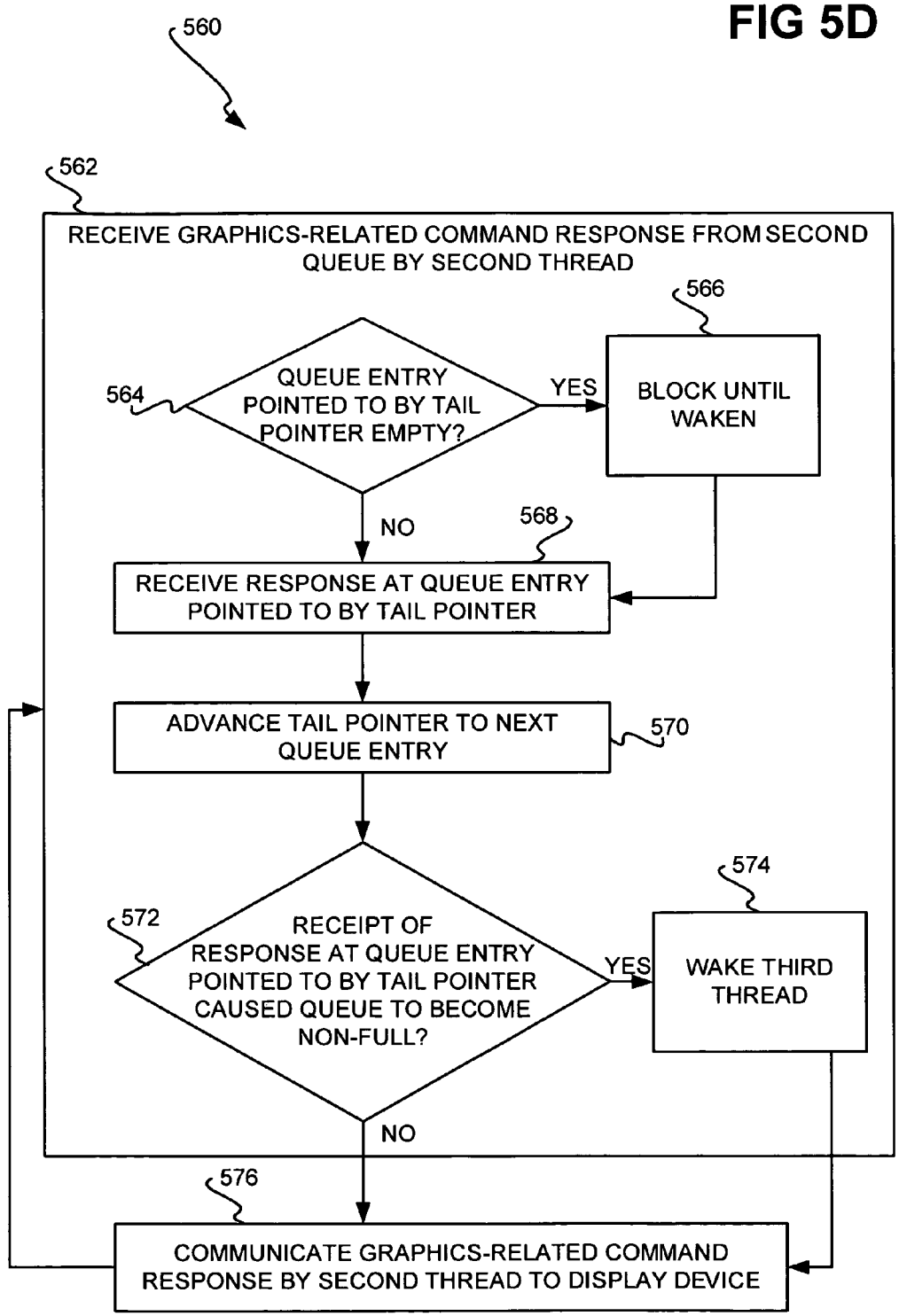

Referring finally to FIG. 5D, the method 560 is performed when a graphics-related command response is to be received from the second queue 212 by the second thread 208. The method 560 is described as starting in relation to being performed when the second thread 208 attempts to receive a graphics-related command response from the second queue 212 (562). Thus, if the queue entry pointed to by the tail pointer for the queue 212 is empty (564), then the second thread 208 blocks until it is waken by the third thread 214 (566), to indicate that there is a response on the second queue 212 now that is to be consumed. In actuality, then, the method 560 starts at part 566, since initially it is not waken until there is a command on the second queue 212. However, the method 560 is depicted in FIG. 5D as starting by attempting to receive a graphics-related command response from the queue 212 in part 562 for illustrative consistency and correspondence with the method 540 of FIG. 5C.

Therefore, ultimately the second thread 208 receives a response at the queue entry pointed to by the tail pointer (568). Receipt of the response consumes the response from the queue entry, such that this queue entry then becomes empty. The second thread 208 advances the tail pointer to the next queue entry within the second queue 212 (570). Furthermore, if receipt of the response at the queue entry pointed to by the tail pointer caused the queue 212 to become non-full (572) (i.e., it was previously full and now is no longer full), then the second thread 208 wakes the third thread 214 (574), which may have been blocking in part 548 of the method 540 of FIG. 5C. The second thread 208 ultimately communicates the graphics-related command response to the display device 106 of the remote client computing device 104 (576). The second thread 208 then repeats the method 560 beginning at 562. That is, the second thread 208 may at some point receive all the responses within the queue 212, such that it blocks at part 566.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For instance, embodiments of the invention have been substantially described herein in relation to graphics-related hardware for processing graphics-related commands into graphics-related command responses. However, other embodiments of the invention are applicable to other types of hardware, for processing other types of commands into other types of command responses. Therefore, it is manifestly intended that this invention be limited only by the claims and equivalents thereof.

We claim:

1. A server computing device comprising:
graphics hardware for processing graphics-related commands into graphics-related command responses;
a first queue and a second queue;
a guest operating system;
a virtual client computing environment that is to run as a session within the guest operating system and that is for interacting with a remote client computing device that is not part of but that is communicatively coupled to the server computing device, the virtual computing environment corresponding to the remote client computing device such that input and output with a user of the remote client computing device is performed at the remote client computing device, and such that processing of the input to provide the output is performed at the virtual client computing environment, the virtual client computing environment comprising:
an encoding application, the encoding application being run within the virtual client computing environment for the user of the remote client computing device such that the user of the remote client computing device interacts with the remote client computing device as if the encoding application were running on an operating system installed on the remote client computing device whereas in actuality the operating system is installed on the server computing device, and such that the remote client computing device acts as a dumb terminal, the encoding application to issue the graphics-related commands and comprising:
a first thread to receive the graphics-related commands and to place the graphics-related commands onto the first queue; and,
a second thread to receive the graphics-related command responses from the second queue and to communicate the graphics-related command responses to a display device of the remote client computing device;
a server computing environment for managing the virtual client computing environment, the server computing environment not part of the virtual client computing environment, the virtual client computing environment not part of the server computing environment, and the server computing environment comprising:
a decoding application comprising a third thread to receive the graphics-related commands from the first queue, to communicate the graphics-related commands to the graphics hardware for processing, to receive the graphics-related command responses from the graphics hardware, and to place the graphics-related command responses onto the second queue,
wherein the graphics-related commands comprises a synchronous graphics-related command, the first thread is to place the synchronous graphics-related command onto the first queue and wait to place any further graphics-related commands onto the first queue until the second thread has received a graphics-related command response from the second queue and that is associated with the synchronous graphics-related command.

2. The server computing device of claim 1, wherein the graphics-related commands are OpenGL commands.

3. The server computing device of claim 1, wherein the first queue comprises a plurality of queue entries, the first thread is to place one of the graphics-related commands at a queue entry pointed to by a head pointer, such that the head pointer is moved to a next available queue entry, and the third thread is to receive one of the graphics-related commands at a queue entry pointed to by a tail pointer, such that the tail pointer is moved to a next queue entry containing one of the graphics-related commands.

4. The server computing device of claim 1, wherein the second queue comprises a plurality of queue entries, the third thread is to place one of the graphics-related command responses at a queue entry pointed to by a head pointer, such that the head pointer is moved to a next available queue entry, and the second thread is to receive one of the graphics-related command responses at a queue entry pointed to by a tail pointer, such that the tail pointer is moved to a next queue entry containing one of the graphics-related command responses.

5. A server computing device comprising:
hardware for processing specific commands into responses;
a guest operating system;
a virtual client computing environment that is to run as a session within the guest operating system and that is for interacting with a remote client computing device that is not part of but that is communicatively coupled to the server computing device, the virtual computing environment corresponding to the remote client computing device such that input and output with a user of the remote client computing device is performed at the remote client computing device, and such that processing of the input to provide the output is performed at the virtual client computing environment, the virtual client computing environment to issue the specific commands and comprising:
  a first thread to receive the specific commands issued within the virtual client computing environment and to place the specific commands onto a first queue; and,
  a second thread to receive the responses from a second queue and to communicate the responses to corresponding hardware of the remote client computing device;
a server computing environment for managing the virtual client computing environment, the server computing environment not part of the virtual client computing environment, the virtual client computing environment not part of the server computing environment, and the server computing environment comprising:
  a third thread to receive the specific commands from the first queue, to communicate the specific commands to the hardware for processing, to receive the responses from the hardware, and to place the responses onto the second queue,
wherein applications are run within the virtual client computing environment for the user of the remote client computing device such that the user of the remote client computing device interacts with the remote client computing device as if the applications were running on an operating system installed on the remote client computing device whereas in actuality the operating system is installed on the server computing device, and such that the remote client computing device acts as a dumb terminal,
and wherein the graphics-related commands comprises a synchronous graphics-related command, the first thread is to place the synchronous graphics-related command onto the first queue and wait to place any further graphics-related commands onto the first queue until the second thread has received a graphics-related command response from the second queue and that is associated with the synchronous graphics-related command.

6. The server computing device of claim 5, wherein the virtual client computing environment comprises an encoding application encompassing the first and the second threads.

7. The server computing device of claim 5, wherein the server computing environment comprises a decoding application encompassing the third thread.

8. The server computing device of claim 5, wherein the hardware is graphics hardware, and the specific commands are graphics-related commands.

9. A method comprising:
receiving a graphics-related command by a first thread of a virtual client computing environment running as a session of a guest operating system of a server computing device as issued by an encoding application running within a virtual client computing environment of the server computing device, the virtual client computing environment for interacting with a remote client computing device that is not part of but that is communicatively coupled to the server computing device, the virtual computing environment corresponding to the remote client computing device such that input and output with a user of the remote client computing device is performed at the remote client computing device, and such that processing of the input to provide the output is performed at the virtual client computing environment, the server computing environment for managing the virtual client computing environment, the server computing environment not part of the virtual client computing environment, and the virtual client computing environment not part of the server computing environment;
placing the graphics-related command by the first thread onto a first queue;
receiving the graphics-related command from the first queue by a third thread of the server computing environment;
communicating the graphics-related command by the third thread to graphics hardware of the server computing device for processing into a graphics-related command response;
receiving the graphics-related command response by the third thread from the graphics hardware;
placing the graphics-related command response by the third thread onto a second queue;
receiving the graphics-related command response from the second queue by a second thread of the virtual client computing environment;
communicating the graphics-related command response by the second thread to a display device of the remote client computing device,
wherein the encoding application is run within the virtual client computing environment for the user of the remote client computing device such that the user of the remote client computing device interacts with the remote client computing device as if the encoding application were running on an operating system installed on the remote client computing device whereas in actuality the operating system is installed on the server computing device, and such that the remote client computing device acts as a dumb terminal;

after placing the graphics-related command by the first thread onto the first queue:
  determining by the first thread that the graphics-related command is a synchronous graphics-related command;
  in response, the first thread blocking such that the first thread does not place any further graphics-related commands onto the first queue;
  after receiving the graphics-related command response from the second queue by the second thread:
    determining by the second thread that the graphics-related command response is a synchronous graphics-related command response; and,
    in response, the second thread waking the first thread so that the first thread can again begin to place any further graphics-related commands onto the first queue.

10. The method of claim 9, wherein placing the graphics-related command by the first thread onto the first queue comprises, by the first thread:
  placing the graphics-related command at a queue entry of the first queue pointed to by a head pointer;
  where placement of the graphics-related command at the queue entry causes the first queue to become non-empty, waking the third thread;
  advancing the head pointer to a next queue entry; and,
  where the first queue is completely full, blocking until another queue entry of the first queue becomes empty.

11. The method of claim 9, wherein receiving the graphics-related command from the first queue by the third comprises, by the third thread:
  receiving the graphics-related command from a queue entry of the first queue pointed to by a tail pointer;
  where receipt of the graphics-related command from the queue entry causes the first queue to become non-full, waking the first thread;
  advancing the tail pointer to a next queue entry; and,
  where the first queue is completely empty, blocking until another queue entry of the first queue becomes non-empty.

12. The method of claim 9, wherein placing the graphics-related command response by the third thread onto the second queue comprises, by the third thread:
  placing the graphics-related command response at a queue entry of the second queue pointed to by a head pointer;
  where placement of the graphics-related command response at the queue entry causes the second queue to become non-empty, waking the second thread;
  advancing the head pointer to a next queue entry; and,
  where the second queue is completely full, blocking until another queue entry of the second queue becomes empty.

13. The method of claim 9, wherein receiving the graphics-related command response from the second queue by the second thread comprises, by the second thread:
  receiving the graphics-related command response from a queue entry of the second queue pointed to by a tail pointer;
  where receipt of the graphics-related command response from the queue entry causes the second queue to become non-full, waking the third thread;
  advancing the tail pointer to a next queue entry; and,
  where the second queue is completely empty, blocking until another queue entry of the second queue becomes non-empty.

14. The method of claim 9, wherein the graphics-related commands are OpenGL commands.

15. An article of manufacture comprising:
  a non-transitory computer-readable recordable data storage medium;
  first means in the medium for receiving commands issued within a virtual client computing environment and for placing the commands onto a first queue, the virtual client computing environment running as a session of a guest operating system of a server computing device;
  second means in the medium for receiving responses from a second queue and for communicating the responses to corresponding hardware of a remote client computing device associated with the virtual client computing environment; and,
  third means in the medium for receiving the commands from the first queue, for communicating the commands to hardware for processing the commands into the responses, for receiving the responses from the hardware, and for placing the responses onto the second queue,
  wherein the third means is a server computing environment for managing the virtual client computing environment, the server computing environment and the virtual client computing environment both being part of the server computing device that is not part of but that is communicatively coupled to the remote computing device,
  wherein the virtual computing environment corresponds to the remote client computing device such that input and output with a user of the remote client computing device is performed at the remote client computing device, and such that processing of the input to provide the output is performed at the virtual client computing environment, the server computing environment for managing the virtual client computing environment, the server computing environment not part of the virtual client computing environment, and the virtual client computing environment not part of the server computing environment,
  wherein applications are run within the virtual client computing environment for the user of the remote client computing device such that the user of the remote client computing device interacts with the remote client computing device as if the applications were running on an operating system installed on the remote client computing device whereas in actuality the operating system is installed on the server computing device, and such that the remote client computing device acts as a dumb terminal,
  and wherein the graphics-related commands comprises a synchronous graphics-related command, the first thread is to place the synchronous graphics-related command onto the first queue and wait to place any further graphics-related commands onto the first queue until the second thread has received a graphics-related command response from the second queue and that is associated with the synchronous graphics-related command.

16. The article of manufacture of claim 15, wherein the hardware is graphics hardware, and the commands are graphics-related commands.

* * * * *